United States Patent Office 3,423,596
Patented Jan. 21, 1969

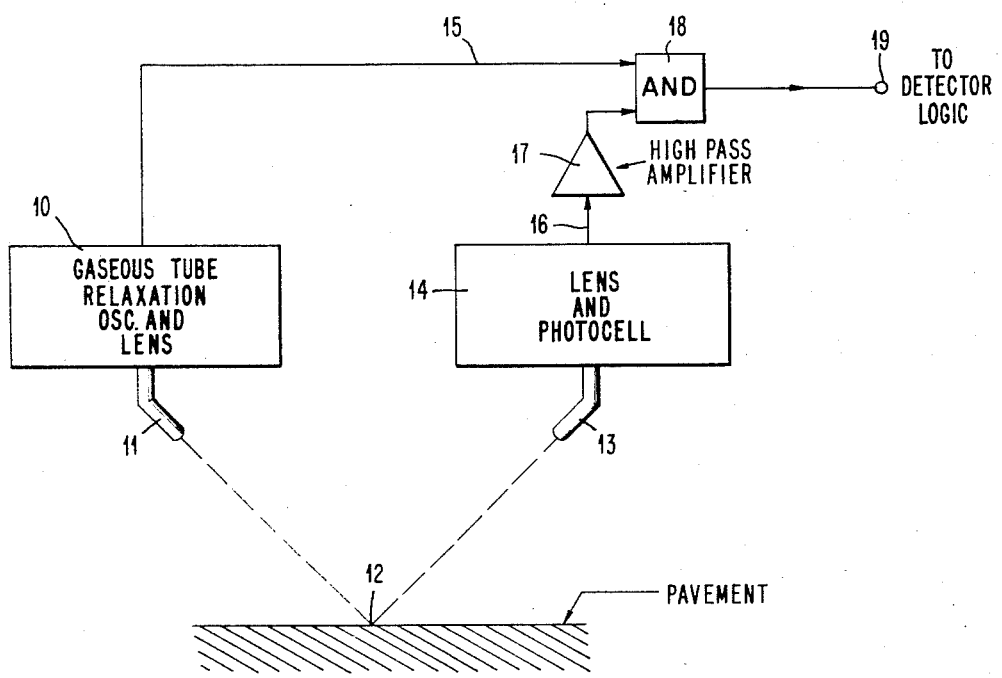

3,423,596
APPARATUS WHEREIN A PULSED LIGHT BEAM IS INTERRUPTED HAVING A HIGH PASS FILTER SO THAT THE PHOTOCELL IS RESPONSIVE ONLY TO THE LEADING EDGE OF THE LIGHT PULSE
Walter K. French, Montrose, N.Y., assignor to International Business Machines Corporation, Armonk, N.Y., a corporation of New York
Filed Dec. 30, 1964, Ser. No. 422,291
U.S. Cl. 250—222                                4 Claims
Int. Cl. H01j 39/12

ABSTRACT OF THE DISCLOSURE

A vehicle detection device utilizing a square wave producing light source in conjunction with a high pass filter. Light flashes are projected upon a surface and subsequently reflected to a photo cell. The output of the photo cell is passed through a high pass filter, thus preventing the detector from recognizing ambient light, not characterized by a fast rise time, as an output. Vehicles are detected when they block the reflected light causing an interruption in the output of the high pass filter.

---

This invention relates to light operated devices and more particularly to apparatus for detecting the passage of automotive vehicles in a roadway.

While it will be apparent that the principles of the invention may be exploited in a variety of applications, the counting of automotive vehicles not only subjects an apparatus embodying the invention to the most stringent operating conditions, but also it best illustrates the principles of the invention.

Opaque bodies have long been detected by using light beams aimed at a photocell across the path to be traversed. Various expedients have been employed to increase the range, flexibility, and sensitivity of these devices. One of these expedients, designed to increase the sensitivity of the device, was that of employing a modulated light source, a photocell pick-up, and an amplifier tuned to the modulation frequency. Devices embodying this principle of operation have been employed to measure the distance from the ground to the cloud cover. In that application, a modulated light source directs a beam of light vertically upward to image a spot of light on the under surface of the clouds. A photocell pick-up having a tuned amplifier is swept through the meridian until it detects the spot on the cloud. By triangulation, the height of the clouds is computed. Devices of this nature operate even in broad daylight when the ambient light may be several hundred thousand times as strong as the modulated light, but the photocell and its associated amplifier will respond only to the latter.

The present invention improves upon the sensitivity of the modulated light source and tuned receiver by employing an intermittently flashing light, but using a high pass amplifier which responds to the essentially infinite rate of change of illumination as the light source turns on. The apparatus employs a very weak flashing neon glow tube and an optical system for focusing the image of the glow upon the surface of the pavement. A photocell and lens system is oriented such that the illuminated spot in the pavement is imaged upon the photoresponsive element in the photocell. The output of the photocell is then connected to a high pass filtering type of amplifier which completes the essential elements of the invention. With such a configuration, the apparatus produces a response upon every flash of the light source, except when an opaque object such as an automobile blocks the optical path. The lack of a response measures the presence of the vehicle.

It is, therefore, an object of this invention to provide an object detection apparatus having a flashing light source, a photoresponsive device, a filtering amplifier operative to pass only frequencies substantially higher than the flashing frequency of light source, and means for imaging the illumination effect of the light source upon the photocell.

A further object of the invention is to provide a vehicle detection apparatus employing a glow discharge type light source connected in a relaxation oscillation circuit to cause the light source to flash intermittently, a lens for imaging the light source as an illuminated spot upon the pavement, a photoresponsive device, a second lens for imaging the illuminated spot upon the photoresponsive device, and a high pass filtering amplifier for filtering and amplifying signals having a frequency far in excess of the oscillation frequency of the relaxation oscillator in which the light source is connected.

Another object is to provide a vehicle detector in accordance with the foregoing object in which a further safeguard against other flashing light sources is provided in the form of a logical AND gate connected to and conjointly operated by the relaxation oscillator and the high pass amplifier.

The foregoing and other objects, features and advantages of the invention will be apparent from the following more particular description of a preferred embodiment of the invention, as illustrated in the accompanying drawing.

In the drawing:

The sole figure illustrates schematically, the operation of the invention.

In the drawing, the pavement surface upon which is imaged the spot 12 is a portion of a roadway over which the vehicles to be counted will travel. It may be the traffic lane adjacent to a toll booth, the open highway, a city street, or a parking lot entrance. Wherever it is located, it is illuminated by sunlight, streetlights (including mercury arc lights), neon signs, and vehicle headlights. It is also illuminated, and more importantly so, by the flashing light source located in the box 10. Herein is a neon glow tube, specifically a .6 watt type NE–83, connected in a relaxation oscillator type of circuit to flash at a rate of approximately one thousand flashes per second. Actually, the frequency of oscillation is immaterial; the light could just as well be flashed by a manually operated switch or by any other means. It is convenient, however, to use the relaxation oscillator because of its cheapness. The lens 11 images the glow discharge from the neon bulb as an illuminated spot 12 upon the pavement.

The lens 13 images the spot 12 on the pavement upon the photosensitive element in the photocell 14 which produces an output responsive to the intensity of incident light. The photocell output preserves the fast rise time characteristics of the glow discharge from the neon. The photocell 14 will, in the absence of a vehicle cause a succession of pulses of 1 kc. frequency to appear on the line 16. The amplifier 17 is peaked to attenuate all signals below 30 to 50 kc. and pass and amplify those in excess of that frequency range. The amplifier 17 will, therefore, ignore the 1 kc. flashing frequency and operate only on the infinitely steep wavefront as the light turns on. The frequency components in this wavefront exceed the cutoff of amplifier 17 by a generous margin of safety. However, to insure against interference by other flashing lights AND gate 18 is additionally provided. Thus, in order to obtain repetitive output response at the output hub 19, the output from the relaxation oscillator 10 is "ANDed" via wire 15 with the output from amplifier 17. This extra precaution militates against the possibility of a flashing exterior light source affecting the photocell 14 in the same manner as the neon source. While tests have failed to prove that this is indeed a problem, the AND gate 18 remains as an additional safeguard. Tungsten filament lamps, because they must heat a filament to incandescence cannot achieve a sufficiently fast rise time. Neon advertising signs operated from a sine wave source, equally do not bother the apparatus.

The output hub 19, in the absence of a vehicle in the pavement, will be energized by a pulsed signal at the oscillation frequency of 1 kc. This, in effect, is the full equivalent of a continuously existing potential on the hubs. As soon as a vehicle passes over the spot 12 so as to destroy the optical relationships, the output on the hub 19 will cease for the duration of the presence of the vehicle. This cessation of output may be inverted by suitable detector logic and caused to operate a counter or other work circuit.

While the path of the light to and from the pavement has been illustrated as employing equal angles of incidence and reflection, this is not necessary, although it will contribute to the sensitivity of the apparatus. The pavement is obviously not a mirror, nor is it optically smooth. Therefore, it is only necessary that the source image upon the pavement and the image be imaged upon the photocell.

An unobvious advantage of the apparatus that can be exploited for better discrimination between vehicles, is the ability to image the spot 12 upon the pavement as an elongated spot whose longer dimension is transverse to the direction of traffic flow. This then, permits use of wider traffic lanes without danger of vehicles missing the beam, while at the same time permitting a minimal longitudinal spot dimension to permit good resolution between vehicles.

With the foregoing simple expedient of employing a high pass filter and a light source capable of producing a rate of change of illumination approaching infinity, the noise rejection and sensitivity of the apparatus has been markedly increased. Because of the low power consumption and inexpensive elements, the overall cost of the device has been so reduced as to permit their saturated use in city streets for traffic control purposes.

While the invention has been particularly shown and described with reference to a preferred embodiment thereof, it will be understood by those skilled in the art that various changes in form and details may be made therein without departing from the spirit and scope of the invention.

What is claimed is:
1. A device for the detection of objects, comprising:
   a light source producing light flashes, each of said flashes having a fast rise time;
   a photosensitive device responsive to reflected light, said photosensitive device producing an output signal representative of the intensity of said reflected light;
   a surface over which objects pass;
   first imaging means imaging said light flashes as a luminous spot upon said surface;
   second imaging means imaging said luminous spot upon said photosensitive device, and
   a high pass filtering device responsive to the output signal of said photosensitive device, said filtering device passing only that portion of said output signal representing said fast rise time of said light flashes, said filtering device passing said fast rise time portion of said light flashes upon the absence of an object over said luminous spot.

2. A vehicle detector, comprising:
   a relaxation oscillator circuit having therein a glow discharge lamp producing a series of light flashes at a predetermined frequency;
   a photo cell producing an output signal representative of the intensity of incident light;
   first imaging means imaging said light flashes as a luminous spot upon a pavement upon which vehicles travel;
   second imaging means imaging said light flashes reflected from said spot to said photo cell;
   a high pass amplifier responsive to said output signal and having a frequency cutoff substantially greater than the frequency of said oscillator; and
   a logical AND gate, connected to said relaxation oscillator and said amplifier, producing output responses at the frequency of said oscillator upon the absence of a vehicle over said spot.

3. The apparatus of claim 1 wherein said light source comprises a glow discharge lamp, a capacitor, and resistor connected in a circuit to provide a free-running relaxation oscillator.

4. The apparatus of claim 3 wherein the said high pass filtering device has a low frequency cutoff which is substantially greater than the frequency of said relaxation oscillator.

References Cited

UNITED STATES PATENTS

| 2,710,559 | 6/1955 | Heitmuller et al. | 250—233 |
| 3,014,127 | 12/1961 | Vlasak | 325—477 |

RALPH G. NILSON, *Primary Examiner.*

MARTIN ABRAMSON, *Assistant Examiner.*

U.S. Cl. X.R.

250—217